(12) United States Patent
Kim et al.

(10) Patent No.: US 12,309,462 B2
(45) Date of Patent: May 20, 2025

(54) COMPUTER SYSTEM FOR RENDERING EVENT-CUSTOMIZED AUDIO CONTENT, AND METHOD THEREOF

(71) Applicants: NAVER CORPORATION, Seongnam-si (KR); GAUDIO LAB, INC., Seoul (KR)

(72) Inventors: Jung Sik Kim, Seongnam-si (KR); Dae Hwang Kim, Seongnam-si (KR); Dong Hwan Kim, Seongnam-si (KR); Taegyu Lee, Seoul (KR); Jeonghun Seo, Seoul (KR); Jiwon Oh, Seoul (KR)

(73) Assignees: NAVER CORPORATION, Seongnam-si (KR); GAUDIO LAB, INC., Seoul (KR)

( * ) Notice: Subject to any disclaimer, the term of this patent is extended or adjusted under 35 U.S.C. 154(b) by 154 days.

(21) Appl. No.: 17/939,306

(22) Filed: Sep. 7, 2022

(65) Prior Publication Data
US 2023/0072261 A1   Mar. 9, 2023

(30) Foreign Application Priority Data
Sep. 9, 2021   (KR) .................... 10-2021-0120507

(51) Int. Cl.
*H04N 21/485* (2011.01)
*H04N 5/60* (2006.01)
*H04N 5/775* (2006.01)

(52) U.S. Cl.
CPC ......... *H04N 21/4852* (2013.01); *H04N 5/607* (2013.01); *H04N 5/775* (2013.01)

(58) Field of Classification Search
CPC ...... G06F 16/68; G06F 16/683; G06F 3/0482; G06F 16/40
USPC .......................................................... 700/94
See application file for complete search history.

(56) References Cited

U.S. PATENT DOCUMENTS

| | | | | |
|---|---|---|---|---|
| 10,313,723 | B2* | 6/2019 | Prins | H04N 21/2187 |
| 2005/0174917 | A1* | 8/2005 | Matsumoto | G11B 7/00772 369/103 |
| 2009/0047004 | A1* | 2/2009 | Johnson | H04N 5/2624 386/E5.064 |
| 2010/0156913 | A1* | 6/2010 | Ortega | G06F 3/1438 345/520 |
| 2015/0002372 | A1* | 1/2015 | Ortega | G06F 3/1423 345/1.3 |
| 2019/0105568 | A1* | 4/2019 | Platt | A63F 13/52 |

FOREIGN PATENT DOCUMENTS

JP   2014500669 A   1/2014

OTHER PUBLICATIONS

Office Action issued in corresponding Korean patent application No. 10-2021-0120507, dated Jun. 10, 2024.

* cited by examiner

*Primary Examiner* — Alexander Krzystan
(74) *Attorney, Agent, or Firm* — GREER BURNS & CRAIN, LTD.

(57) ABSTRACT

A computer system for rendering event-customized audio content and a method thereof. The computer system may be configured to receive an event list of a plurality of events, an audio list for audio rendering information that matches each of the events, and event state information on a current event state, and to output current audio content according to audio rendering information that matches one of the events based on the current event state.

18 Claims, 25 Drawing Sheets

Full shot ; AA, BB, CC, DD(leftt->right)

BB

DD

Split screen ; AA, BB, CC, DD(Clockwise direction)

COMPUTER SYSTEM FOR RENDERING EVENT-CUSTOMIZED AUDIO CONTENT, AND METHOD THEREOF

CROSS-REFERENCE TO RELATED APPLICATION(S)

This U.S. non-provisional application claims the benefit of priority under 35 U.S.C. § 119 to Korean Patent Application No. 10-2021-0120507 filed on Sep. 9, 2021, in the Korean Intellectual Property Office (KIPO), the entire contents of which are incorporated herein by reference.

BACKGROUND OF THE INVENTION

Field of Invention

One or more example embodiments of the following description relate to a computer system for rendering event-customized audio content and a method thereof.

Description of Related Art

In general, a content production environment provides audio content including a fixed sound field for visual content including various views. For example, the content production environment provides audio content by mixing audio signals from a specific venue into a fixed sound field in a desired format while creating visual content by connecting various video scenes, such as a full shot and a close-up shot (i.e., a shot showing a portion of the full shot in an enlarged state), for the specific venue. Therefore, a user simply hears a fixed sound in a desired format based on the audio content while viewing various views by playing back the visual content and the audio content. Therefore, the user has a relatively low sense of immersion in the visual content.

BRIEF SUMMARY OF THE INVENTION

One or more example embodiments provide a computer system for improving a sense of immersion of a user in visual content and a method thereof.

One or more example embodiments also provide a computer system for rendering event-customized audio content and a method thereof.

According to an aspect of at least one example embodiment, there is provided a method by a computer system, the method including receiving an event list of a plurality of events, an audio list for audio rendering information that matches each of the events, and event state information on a current event state; and outputting current audio content according to audio rendering information that matches one of the events based on the current event state.

According to an aspect of at least one example embodiment, there is provided a non-transitory computer-readable recording medium storing instructions that, when executed by a processor, causes the processor to computer-implement the method.

According to an aspect of at least one example embodiment, there is provided a computer system including a memory; a communication module; and a processor configured to connect to each of the memory and the communication module, and to execute at least one instruction stored in the memory. The processor is configured to receive: an event list of a plurality of events, an audio list for audio rendering information that matches each of the events, and event state information on a current event state; and to output current audio content according to audio rendering information that matches one of the events based on the current event state.

According to some example embodiments, a computer system may render event-customized audio content. To this end, different audio rendering information may be matched to different events of visual content. The computer system may render the audio content according to audio rendering information that matches one of the events. Here, the computer system may realize a sense of being-there for the user by spatially processing current audio content according to audio rendering information that matches an event currently being relayed. Therefore, by using the relayed event and audio content rendered accordingly, the user may perceive a sense of being-there as if the user is present at the corresponding venue. That is, the computer system may improve a sense of immersion of the user in the visual content.

Further regions of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
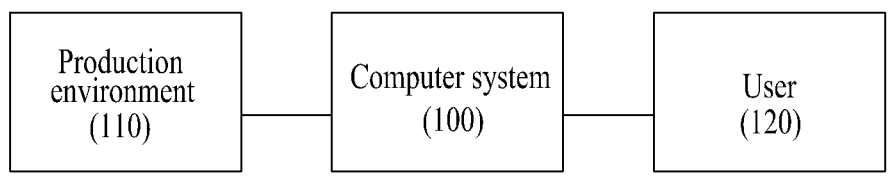
FIG. 1 is a diagram illustrating an example of an operation environment of a computer system according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

Figure 2:
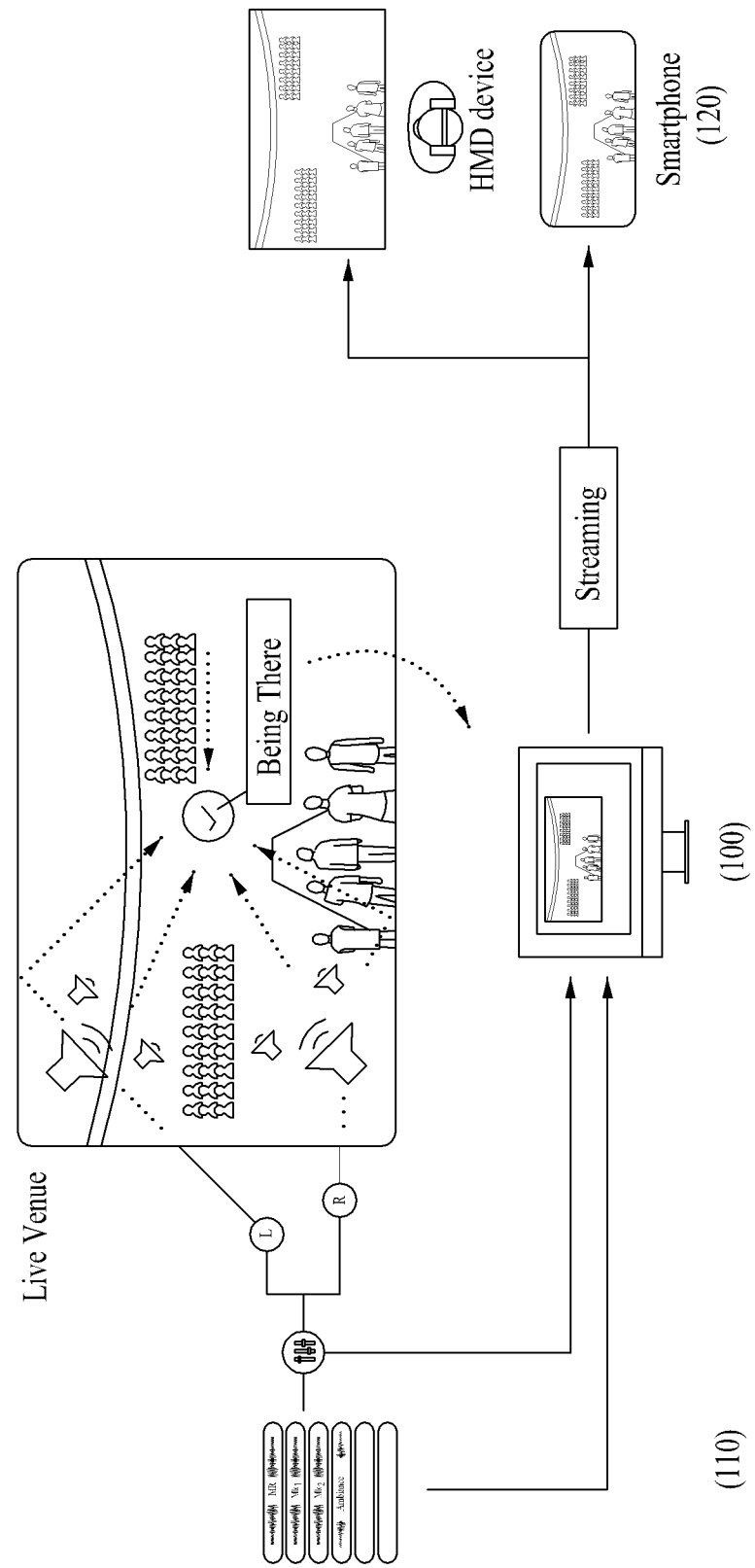
FIG. 2 illustrates an example of an operation environment of a computer system according to at least one example embodiment.

FIG. 1 is a diagram illustrating an example of an operation environment of a computer system 100 according to at least one example embodiment, and FIG. 2 illustrates an example of an operation environment of the computer system 100 according to at least one example embodiment.

Referring to FIG. 1, the computer system 100 may communicate with a production environment 110 and a user 120. The computer system 100 may communicate with the production environment 110 and the user 120 through the same network. Alternatively, the computer system 100 may communicate with the production environment 110 and the user 120 through different networks. Here, the term user 120 may be interchangeably used for an electronic device of the user 120. Such an electronic device may include at least one of a smartphone, a mobile phone, a navigation device, a computer, a laptop computer, a digital broadcasting terminal, a personal digital assistant (PDA), a portable multimedia (PMP), a tablet PC, a game console, a wearable device, an Internet of Things (IoT) device, a home appliance, a medical device, a robot, and a head mounted display (HMD) device.

The production environment 110 may produce multimedia content. In some example embodiments, the production environment 110 may include at least one electronic device. The multimedia content may include visual content and audio content that is synchronized with the visual content. For example, the visual content may include at least one of video content, virtual reality (VR) content, augmented reality (AR) content, and extended reality (XR) content. For example, referring to FIG. 2, the production environment 110 may collect multimedia signals within an actual venue and may produce the multimedia content based on the collected multimedia signals. The visual content may include a plurality of events for a specific venue, for example, at least one of visual events and tactile events. Here, the events may represent different views for the same venue, respectively. For example, for the same venue, a plurality of events may be simultaneously generated. Types of the visual events may include at least one of, for example, a video scene, lighting, fireworks, fog, and a multiple view non-contact screen. Here, the multiple view non-contact screen may represent a screen in which all video scenes captured with different views in a broadcast program venue are displayed together.

Through this, the multimedia content may be provided for the user 120. Here, the multimedia content may be streamed in real time or may be provided at a time desired by the user 120. According to an example embodiment, at least one of the events of the visual content may be relayed, and the event being relayed may be switched between the events. According to another example embodiment, in response to a selection from the user 120, one of the events of the visual content may be relayed.

Therefore, the computer system 100 may render the audio content for the user 120. Here, different audio rendering information may be matched to each of the events. The audio rendering information may represent a spatial audio attribute related to a corresponding event, and may be configured in the form of a preset. In some example embodiments, each of the events may be set as an audio matching event for playing back audio content for a corresponding event or a non-audio matching event for not playing back the audio content for the corresponding event. The computer system 100 may render the audio content according to the audio rendering information that matches one of the events. Here, the computer system 100 may realize a sense of being-there for the user 120 by spatially processing current audio content according to audio rendering information that matches a currently relayed event. Therefore, the user 120 may use the relayed event and the audio content rendered accordingly and may perceive a sense of being-there as if the user 120 is present at a corresponding venue. For example, referring to FIG. 2, the user 120 may experience sound corresponding to a two-dimensionally relayed event while viewing the event through a smartphone. As another example, referring to FIG. 2, the user 120 may experience sound corresponding to a three-dimensionally relayed event while viewing the event through a head mounted display (HMD) device.

Hereinafter, the computer system 100 and a method thereof will be described based on an example in which the events are video scenes captured with different views in a broadcast program venue. However, it is provided as an example only for clarity of description. That is, the computer system 100 and the method thereof may apply to various types of events.

FIGS. 3A-3D, 4A, and 4B illustrate examples of an operation feature of the computer system 100 according to at least one example embodiment.

Figure 3A:
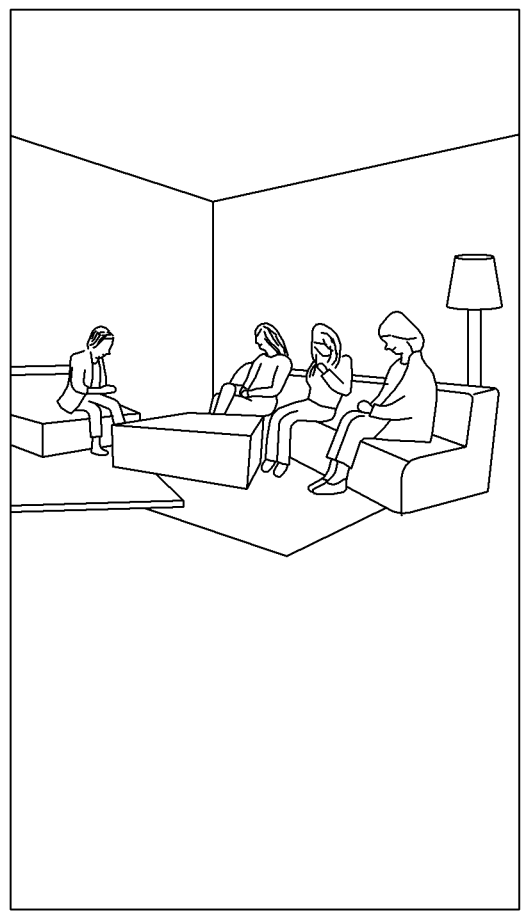
FIGS. 3A-3D, 4A, and 4B illustrate examples of an operation feature of a computer system according to at least one example embodiment.
Figure 3B:
Figure 3C:
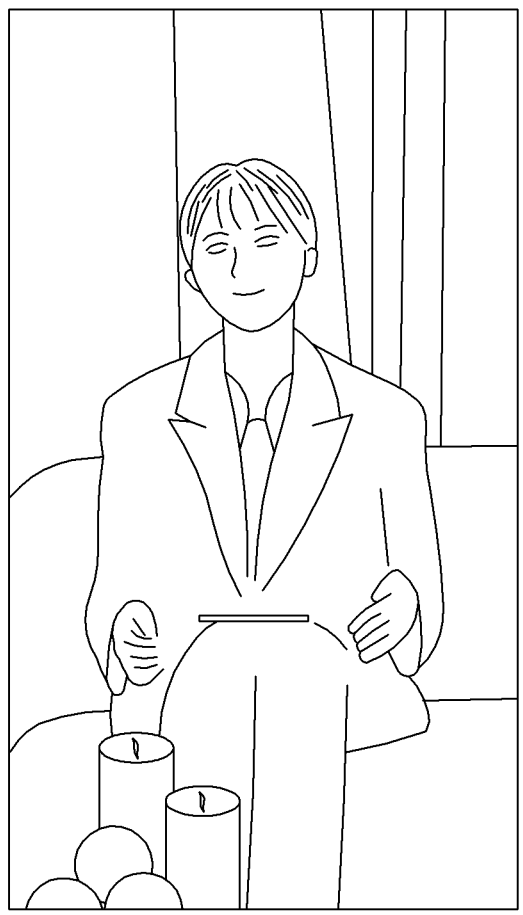
Figure 3D:
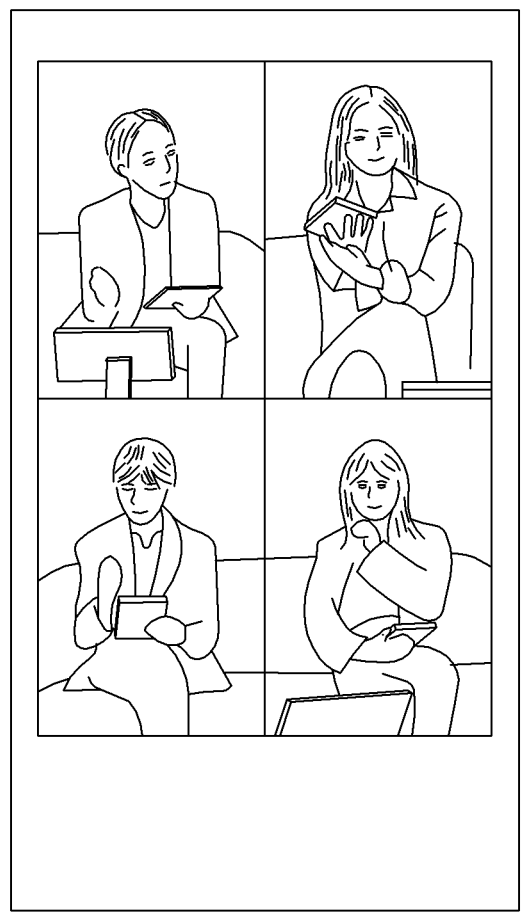
Figure 4A:
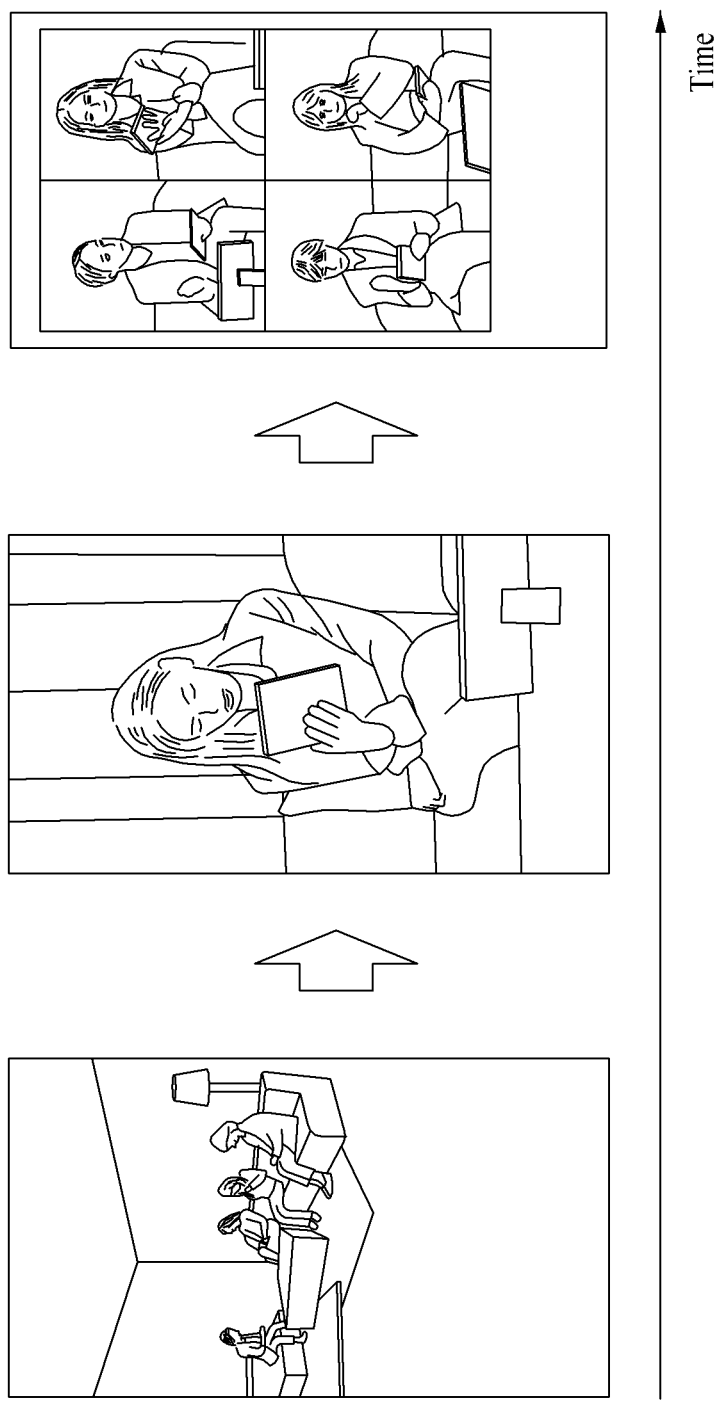
Figure 4B:

Referring to FIGS. 3A-3D, the computer system 100 may differently render audio content according to events. According to an example embodiment, the events may be video scenes captured with different views in a broadcast program venue. For example, each video scene may be one of a full shot as shown in FIG. 3A, a close-up shot (referable to as a portrait shot) as shown in (FIG. 3B or FIG. 3C, or a split screen as shown in FIG. 3D. Here, each of the designations "AA," "BB," "CC," and "DD" may represent a person. For the full shot as shown in FIG. 3A, the computer system 100 may render audio content such that the user 120 may experience sound as if the user 120 is listening to the sound in one corner of the corresponding broadcast program venue. For the close-up shot of a specific person as shown in FIG. 3B or FIG. 3C, the computer system 100 may render the audio content such that the user 120 may experience sound as if the user 120 is listening to the sound in front of the corresponding person. Here, the computer system 100 may render the audio content such that a positional relationship between the corresponding person and a neighboring person may be expressed. For the split screen that includes close-up shots of a plurality of persons as shown in FIG. 3D, the computer system 100 may render the audio content such that persons may be individually verified based on positions of the close-up shots on the split screen.

According to an example embodiment, at least one of the events of the visual content may be relayed, and the relayed event may be switched between the events. In this case, the computer system 100 may automatically detect the relayed event, and may render the audio content that is suitable for the relayed event. For example, referring to FIG. 4A, in a general streaming service, a video scene being relayed is switched, in order, between a full shot (shown towards the left), a close-up shot of a specific person (shown in the middle), for example, person BB, and a split screen (shown towards the right) and, in response thereto, the computer system 100 may render the appropriate audio content. Through this, the user 120 may experience sound as if the user 120 is listening to the sound in one corner of a corresponding broadcast program venue for the full shot, and may experience sound as if the user 120 is listening to the sound in front of the corresponding person for the close-up shot, and may experience sound such that persons may be individually verified based on positions of close-up shots in the split screen for the split screen. In certain embodiments, with regard to the split screen, the user 120 may select one of the individuals from the split screen, and the system 100 will provide the sound as if the user is listening to the sound in front of the selected individual.

According to another example embodiment, in response to a selection from the user 120, one of events of the visual content may be relayed. In this case, the computer system 100 may render the audio content that is suitable for the relayed event. For example, referring to FIG. 4B, in a multi-view streaming service, relayable video scenes may be provided for the user 120. Here, in response to a selection from the user 120, one of the full shot, the close-up shot, and the split screen may be relayed and, in response thereto, the computer system 100 may render the audio content. Alternatively, the computer system 100 may render audio content to be suitable for each of at least one of the full shot, the close-up shot, and the split screen, and may simultaneously transmit all the rendered audio contents. In response to the selection from the user 120, one of the full shot, the close-up shot, and the split screen may be played back and the audio content rendered accordingly may be provided. Through this, the user 120 may experience the corresponding sound while viewing a relayed video scene.

Figure 5:
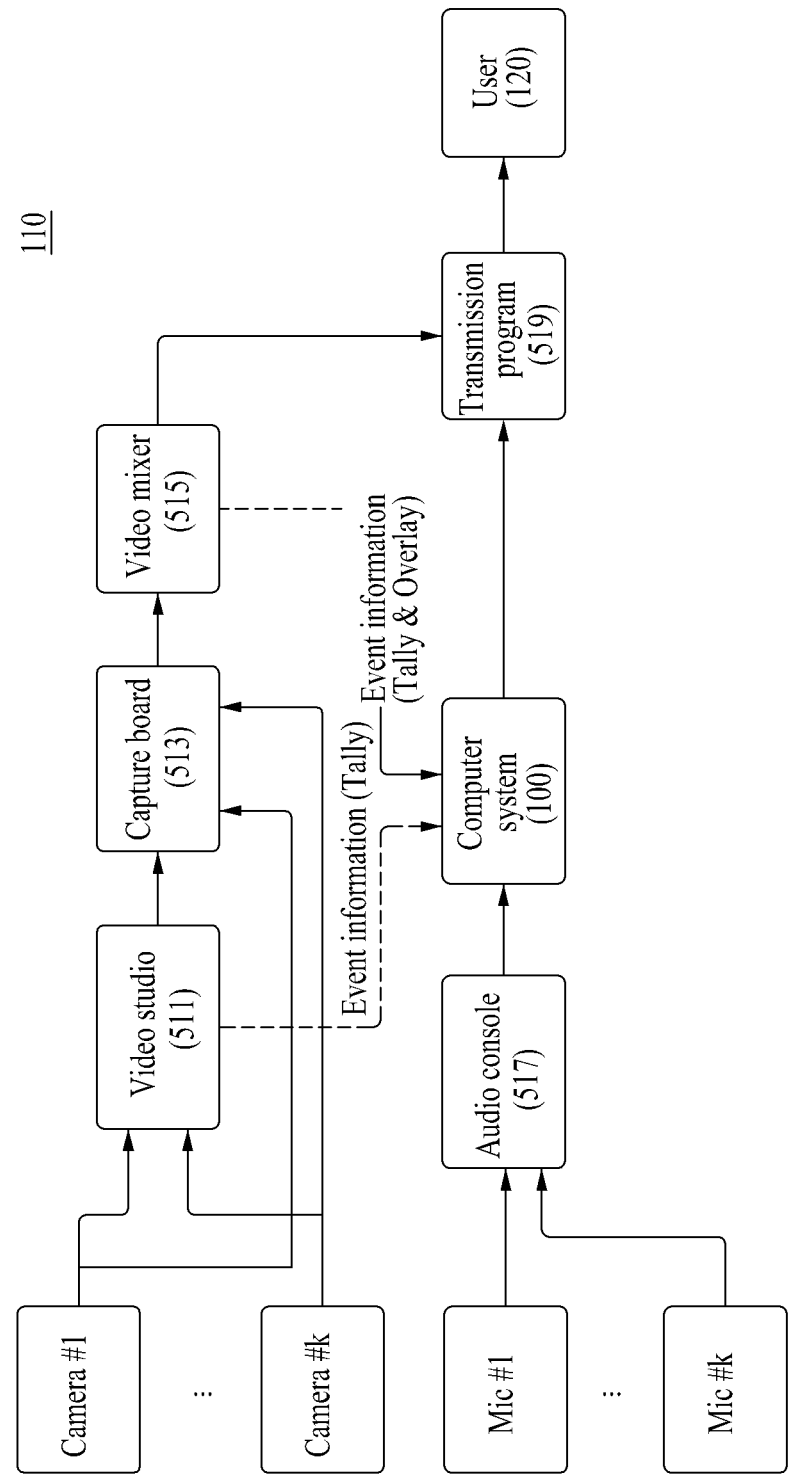
FIG. 5 is a diagram illustrating an example of a production environment related to a computer system according to at least one example embodiment.

FIG. 5 is a diagram illustrating an example of the production environment 110 related to the computer system 100 according to at least one example embodiment, and FIGS. 6, 7A, 7B, 8A, and 8B illustrate examples of an operation feature of the production environment 110 related to the computer system 100 according to at least one example embodiment.

Referring to FIG. 5, the production environment 110 may include one or more video sources, for example, a video studio 511 and a video mixer 515, and the computer system 100 may be connected to at least a portion of the video sources, for example, the video studio 511 and the video mixer 515. For example, the video sources may include at least one of the video studio 511 and the video mixer 515. Here, the video studio 511 and the video mixer 515 may be connected based on a capture board 513. Visual content produced by the video sources, for example, the video studio 511 and the video mixer 515, may be provided to the user 120 through a transmission program 519.

The video studio 511 may be an electronic device for producing the visual content. For example, the video studio 511 may be hardware, such as a video switcher, or software, such as open broadcast software (OBS). The video studio 511 may be individually connected to a plurality of cameras and may generate each of a plurality of events based on videos captured through the cameras. For example, the video studio 511 may generate five video scenes #1, #2, #3, #4, and #5 from videos captured through five different cameras.

In response to a selection from a producer, the video studio 511 may determine an event to be relayed from among the events. For example, the video studio 511 may determine a single video scene #1 as a relay screen and may determine another video scene #2 as a subsequent relay screen. Through this, the video studio 511 may generate tally information. The tally information may be information for identifying the relayed event. For example, the tally information may be used to identify a video scene selected as the relay screen. The tally information may be configured in the form of a video event (a program) that is currently being relayed and a subsequent event (a preview) to be relayed.

Figure 6:
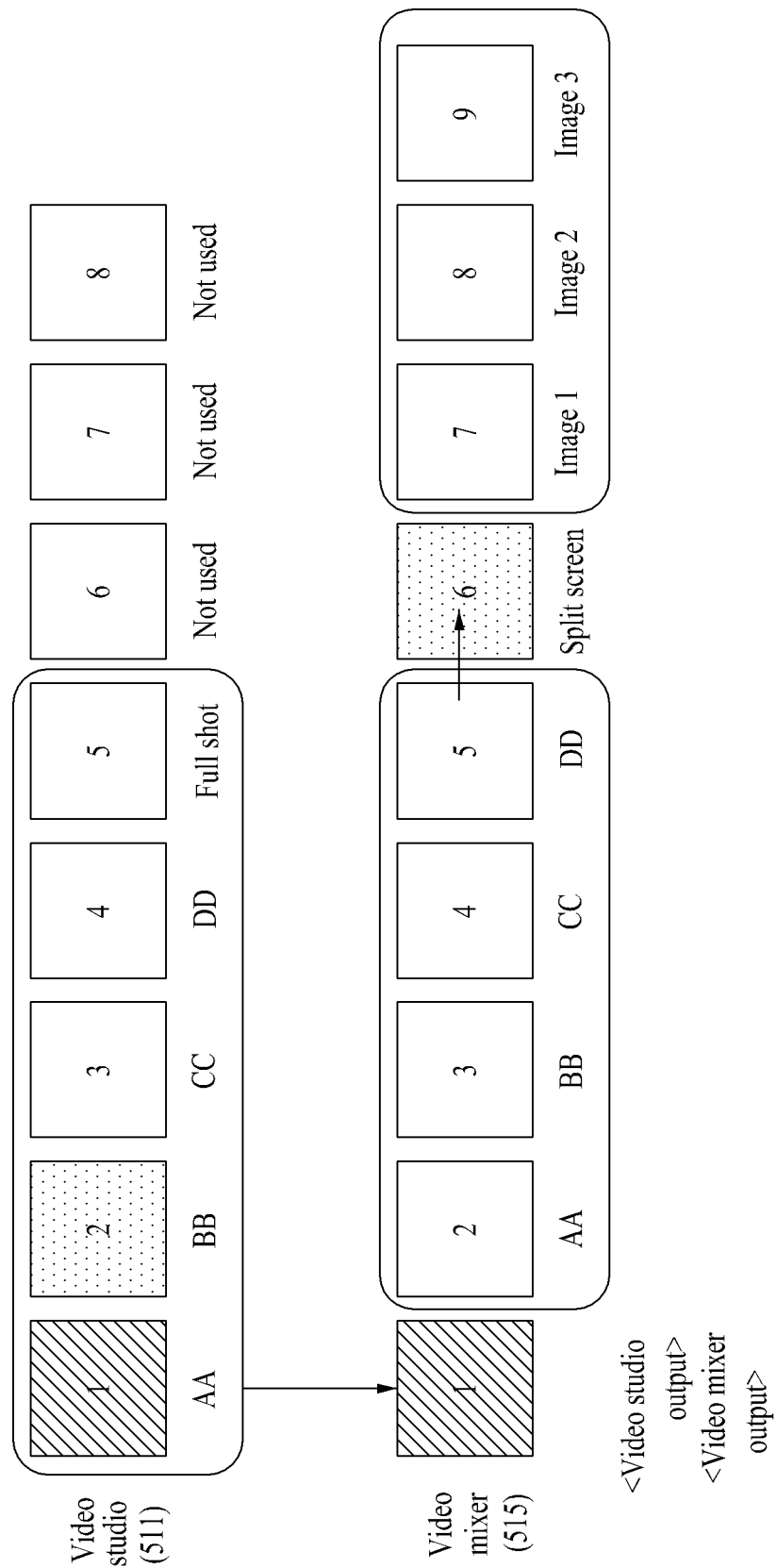
FIGS. 6, 7A, 7B, 8A, and 8B illustrate examples of an operation feature of a production environment related to a computer system according to at least one example embodiment.
Figure 7A:
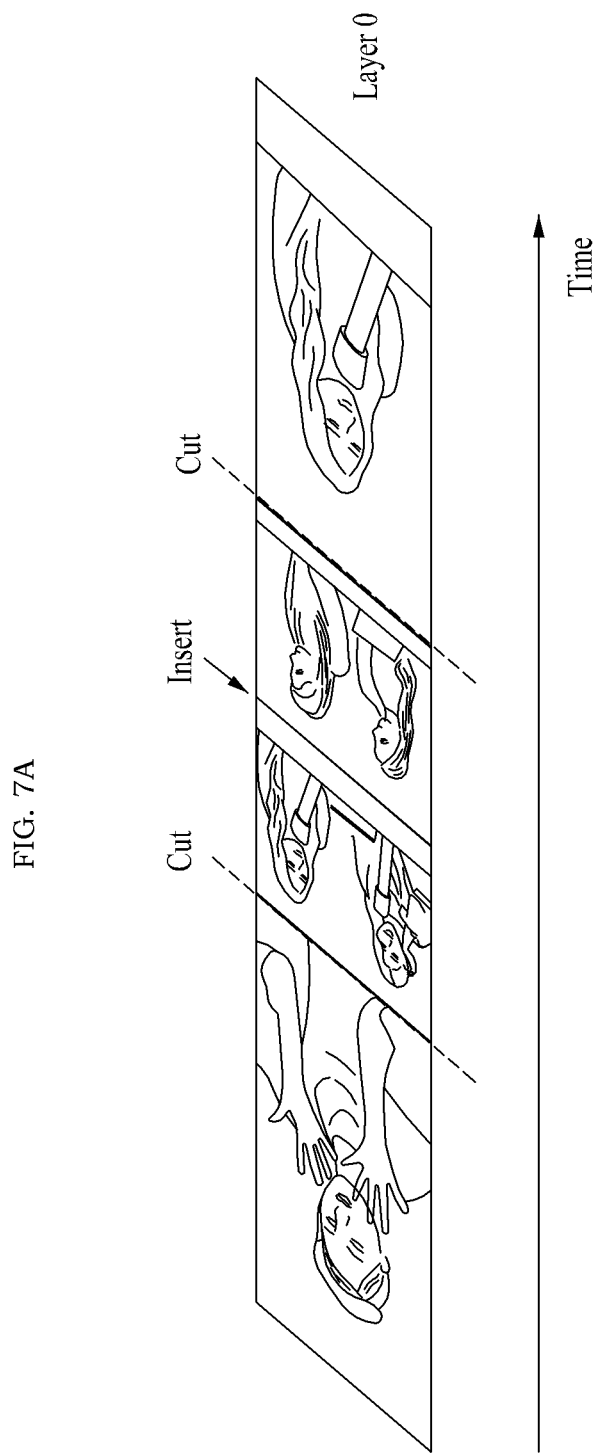
Figure 7B:
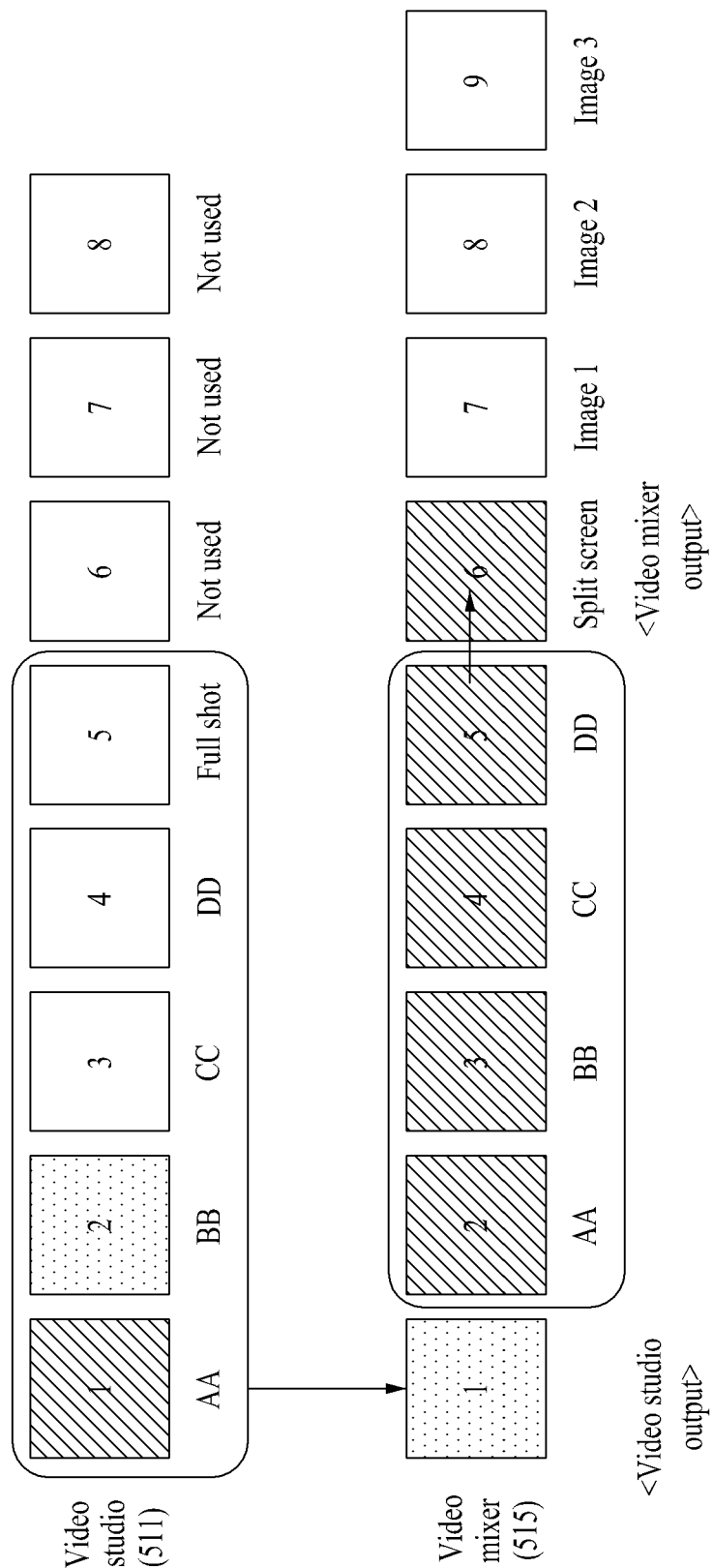
Figure 8A:
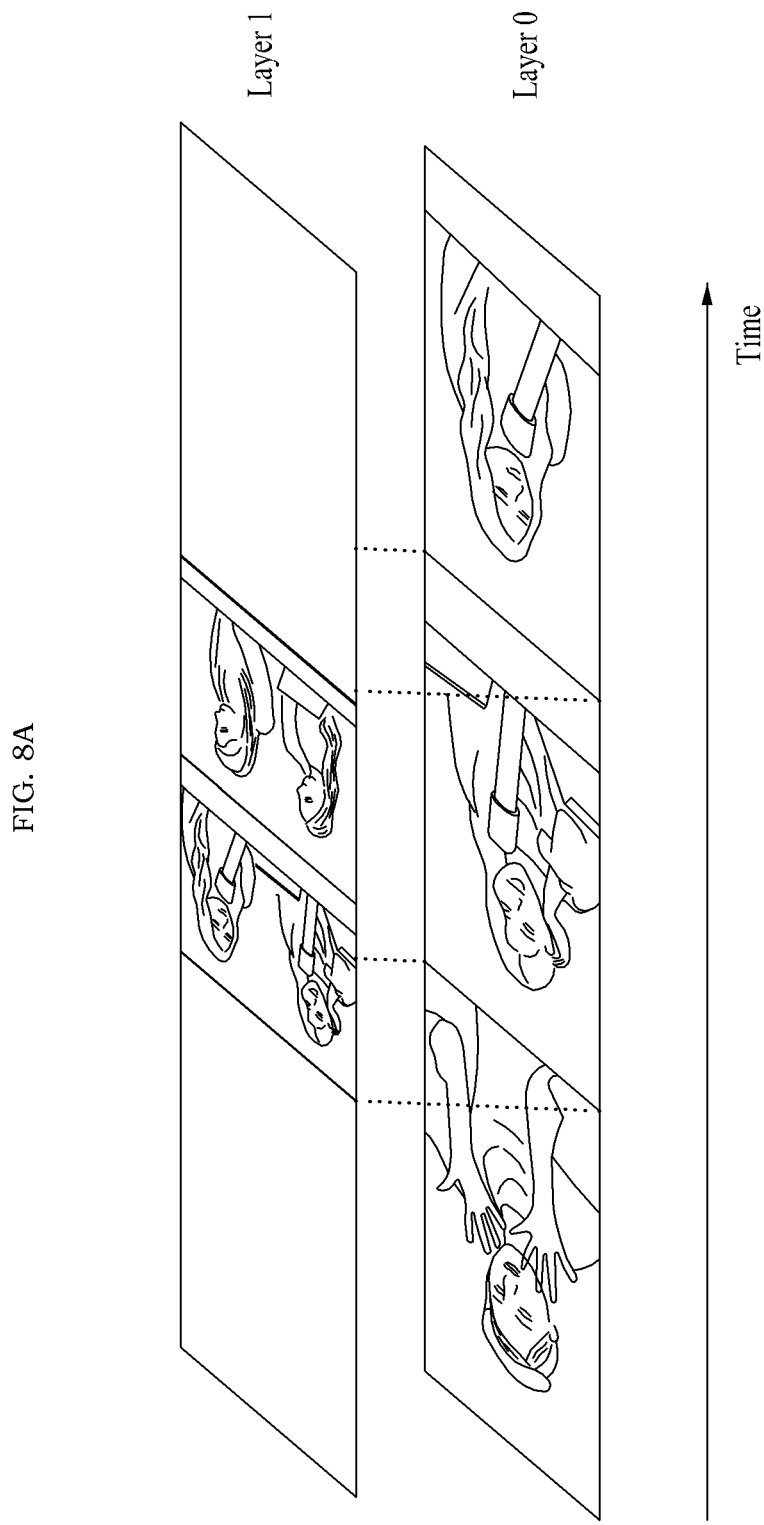
Figure 8B:
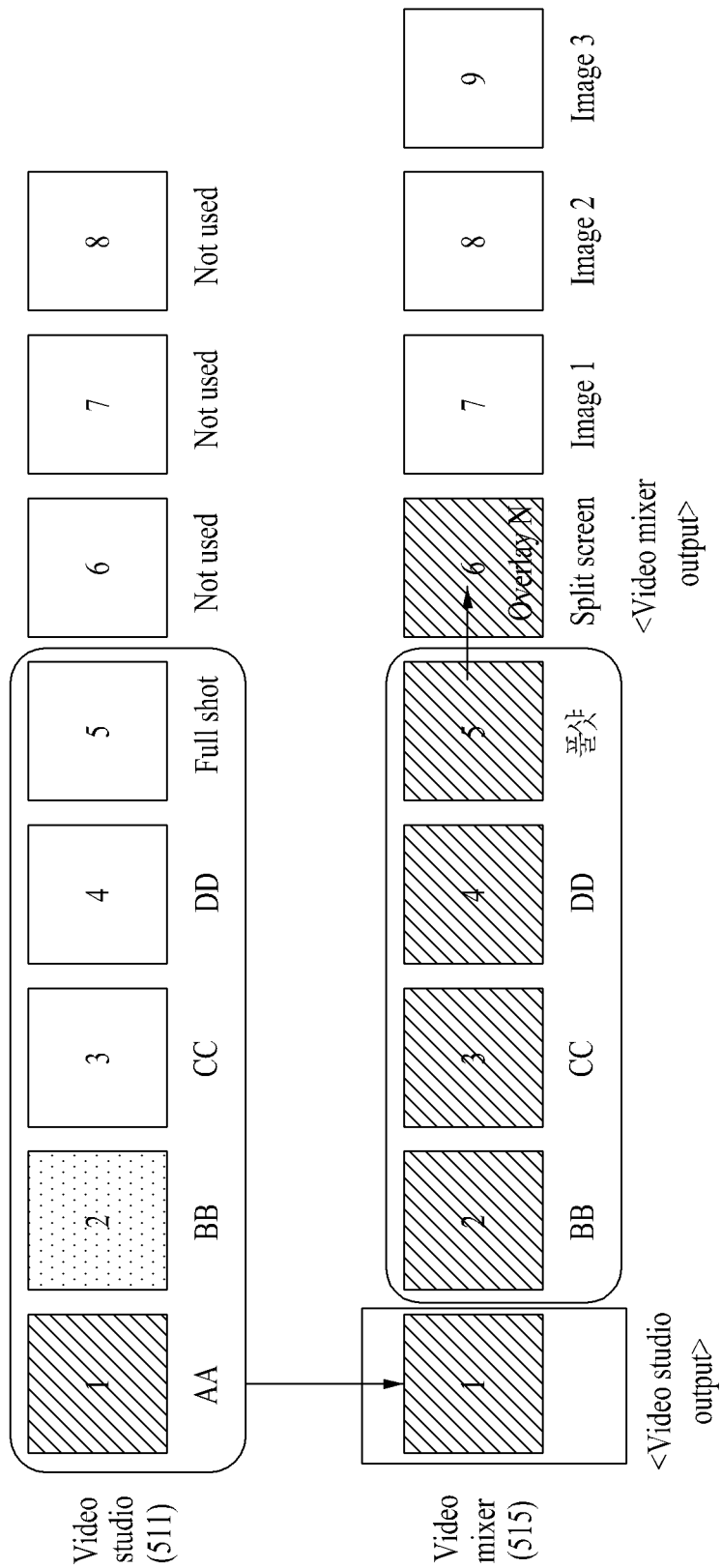

The video mixer 515 may be an electronic device for producing the visual content with the video studio 511. The video mixer 515 may generate events based on videos captured through cameras, video/image input supported by the video mixer 515, and video effects. For example, the video mixer 515 may include video editing software and may generate at least one event using the same. Here, the video mixer 515 may receive the videos captured through the cameras (such as camera #1 through camera #k) and the relay screen from the video studio 511, through the capture board 513. The video mixer 515 may generate at least one event by combining at least two of the videos received by the capture board 513, or by combining at least one of the captured videos and an arbitrary image. Referring to FIG. 6, for example, the video mixer 515 may generate a single video scene #1 from the relay screen determined by the video studio 511, may generate four video scenes #2, #3, #4, and #5 from a portion of the videos captured through the cameras, may generate a single video scene from a split screen that includes at least two of the captured videos, and may generate a corresponding number of video scenes #7, #8, and #9 from among a number of arbitrary images to be overlaid on at least one of the captured videos.

The video mixer 515 may change the relayed event determined by the video studio 511. For example, the video mixer 515 may change the relay screen determined by the video studio 511 to the split screen generated by the video mixer 515. According to an example embodiment, the video mixer 515 may change the relayed event using a cut method. For example, referring to FIG. 7A, the video mixer 515 may switch to a relay screen (cut, dissolve, pattern wipe), and may insert a split screen instead of the corresponding relay screen. In this case, referring to FIG. 7B, the relay screen determined by the video studio 511 may not be relayed. According to another example embodiment, the video mixer 515 may change the relayed event using an overlay method. For example, referring to FIGS. 8A and 8B, the video mixer 515 may overlay the split screen on a top layer (layer 1) of the relay screen. In this case, referring to FIG. 8B, the split screen may be overlaid on the relay screen determined by the video studio 511 and thereby relayed. Through this, the video mixer 515 may generate tally information. The tally information refers to information for identifying the relayed event and, for example, may be used to identify which video is selected as the relay screen. In addition, when the video mixer 515 uses the overlay method, the video mixer 515 may also generate layer information. The layer information refers to information for identifying whether a layer that includes an overlay event is present for each video event. For example, the layer information may be used to identify whether the split screen is overlaid on the upper layer (layer 1) of the relay screen.

Referring back to FIG. 5, the production environment 110 may further include an audio console 517. The computer system 100 may be connected to the audio console 517. The audio console 517 may be an electronic device for producing audio content. The audio console 517 may be connected to each of a plurality of microphones (Mic #1 through Mic #k) that are directly attached to or installed adjacent to a plurality of objects, respectively, in a venue and may produce the audio content based on the audio signals acquired through such microphones. The computer system 100 may provide the audio content to the user 120 through the transmission program 519. Here, the computer system 100 may render the audio content in response to an event relayed to the user 120 through the transmission program 519.

FIGS. 9A, 9B, 9C, 9D, 9E, 9F, 9G, and 9H illustrate examples of a user interface of the computer system 100 according to at least one example embodiment.

Referring to FIGS. 9A, 9B, 9C, 9D, 9E, 9F, 9G, and 9H, the computer system 100 may establish a connection with at least one event source through the user interface. For example, the computer system 100 may be connected to two event sources, for example, the video studio 511 and the video mixer 515. To this end, the computer system 100 may display a setting screen. For example, the setting screen may include source areas allocated to the respective event sources and connection areas for using the connectivity between the event sources. The computer system 100 may establish a connection with the event sources using the setting screen.

Figure 9A:
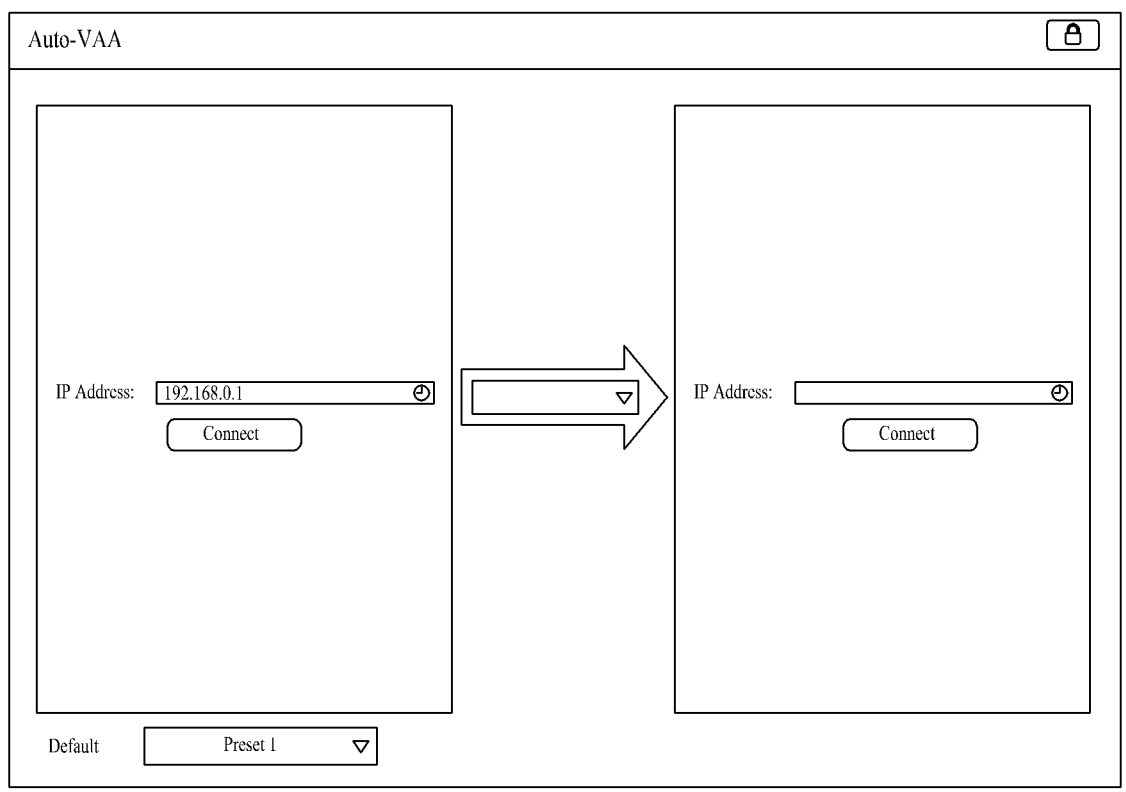
FIGS. 9A, 9B, 9C, 9D, 9E, 9F, 9G, and 9H illustrate examples of a user interface of a computer system according to at least one example embodiment.
Figure 9B:
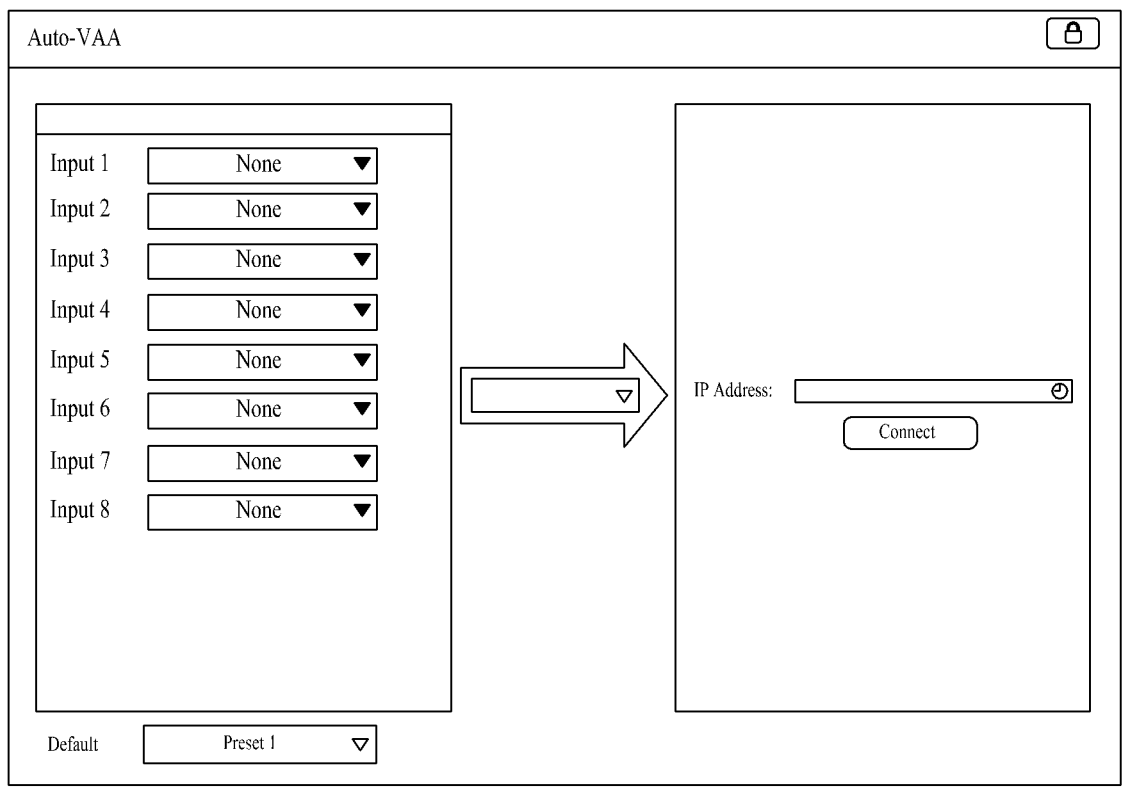
Figure 9C:
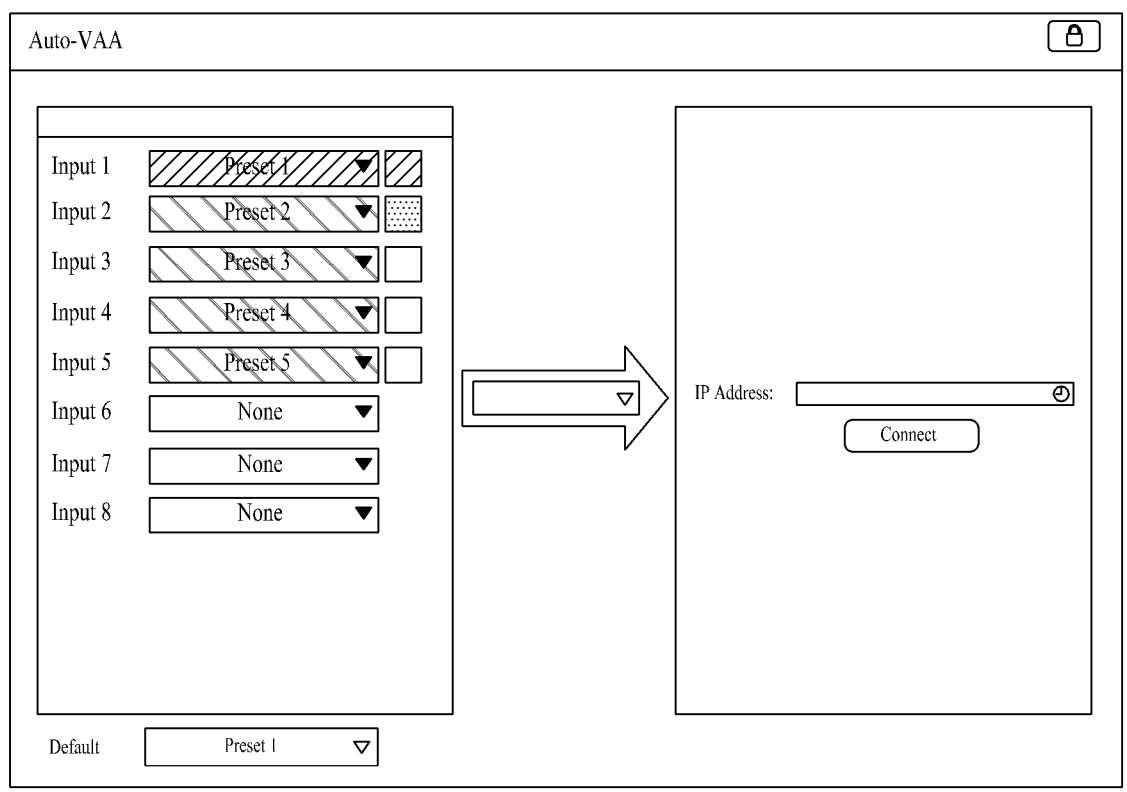

In detail, referring to FIG. 9A, when a creator inputs address information of a single event source, for example, the video studio 511, to a single source area on the setting screen, the computer system 100 may establish a connection with the corresponding event source. Referring to FIG. 9B, the computer system 100 may verify an event list for events generated by the corresponding event source and may display an event list on the setting screen. For example, the event list may be a video input list of the video mixer 515. Referring to FIG. 9C, when audio rendering information, for example, a preset, is input in response to each of the events, the computer system 100 may match the input audio rendering information to each of the events. Through this, an audio list for the audio rendering information may be matched to the event list. Here, the computer system 100 may represent an event being relayed in the event list based on tally information from the corresponding event source. For example, referring to FIG. 9C, when a full shot is input to Input 1 and AA is input to Input 2 of the video mixer 515, audio rendering transition according to a transition effect of the video mixer 515 may be automatically performed by matching audio rendering information as if corresponding sound is heard in one corner of a broadcast program venue to Preset 1, and by matching audio rendering information as if the corresponding sound is heard in front of AA to Preset 2.

Figure 9D:
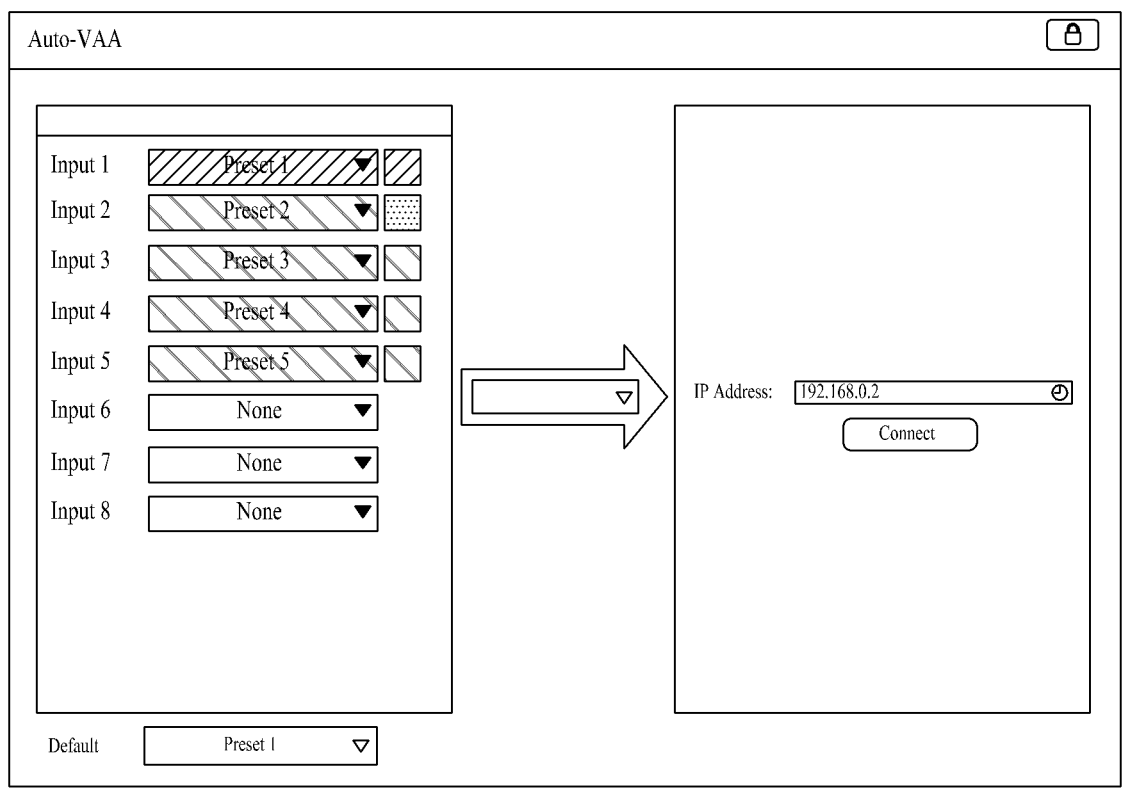
Figure 9E:
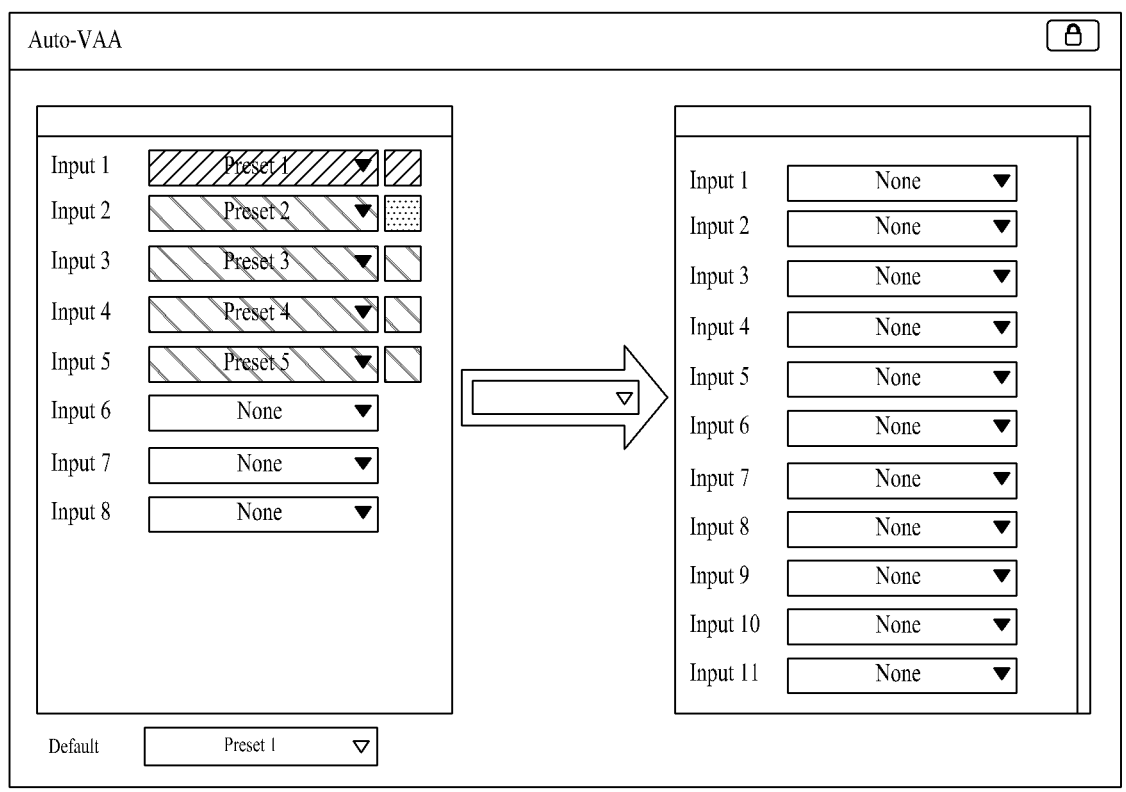

Referring to FIG. 9D, when the creator inputs address information of another event source, for example, the video mixer 515, to another source area on the setting screen by the creator, the computer system 100 may establish a connection with the corresponding event source. Referring to FIG. 9E, the computer system 100 may verify an event list for events generated by the corresponding event source and may display the event list on the setting screen. Referring to FIGS.

9F and 9G, the computer system 100 may match the input audio rendering information to each of the events.

Figure 9F:
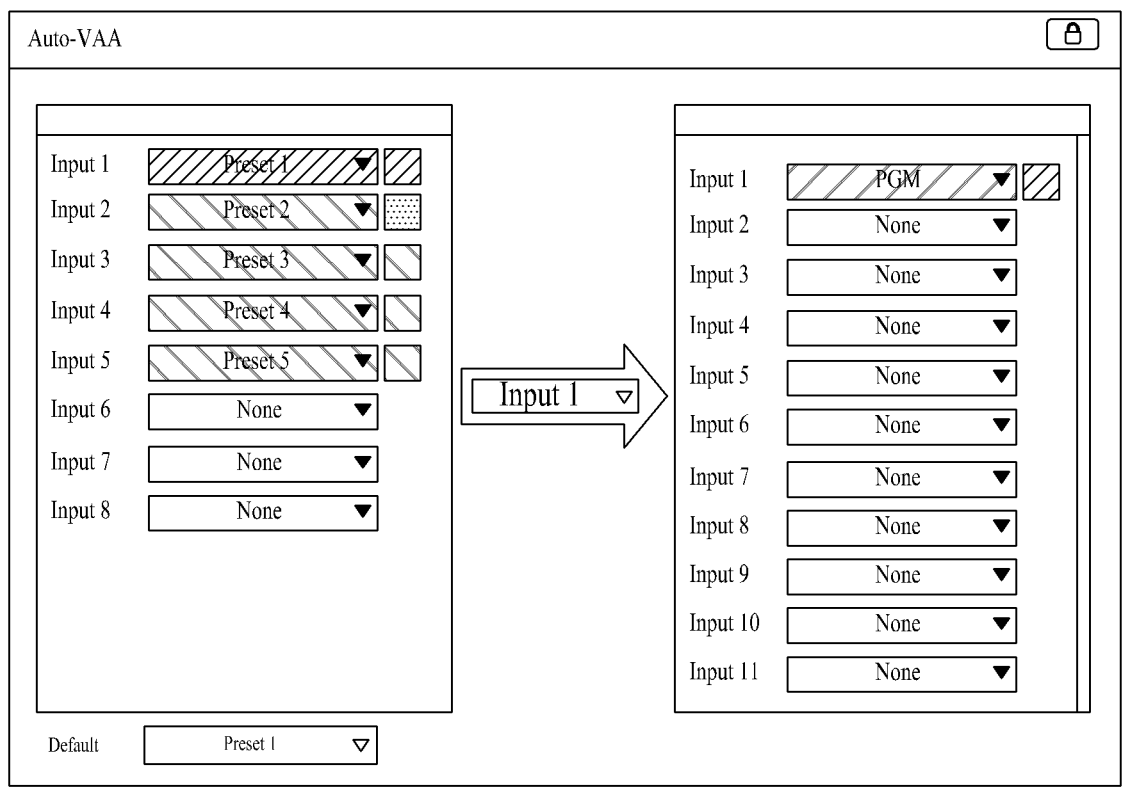
Figure 9G:
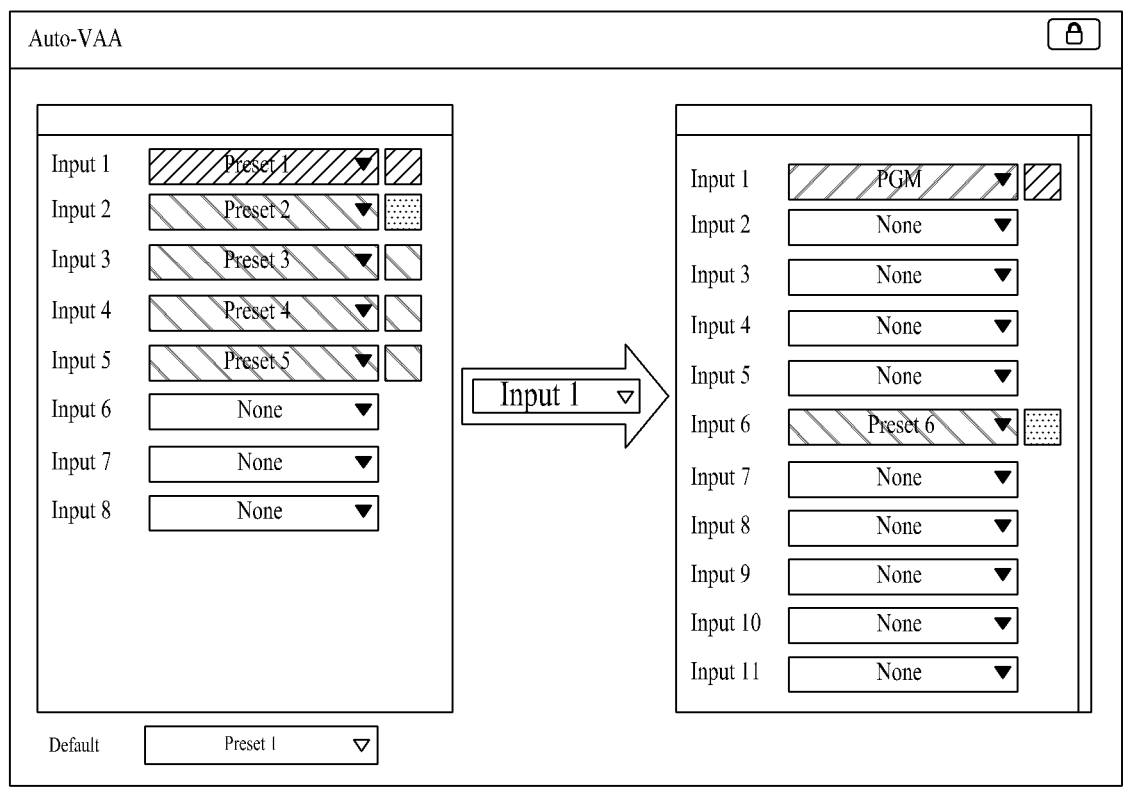
Figure 9H:
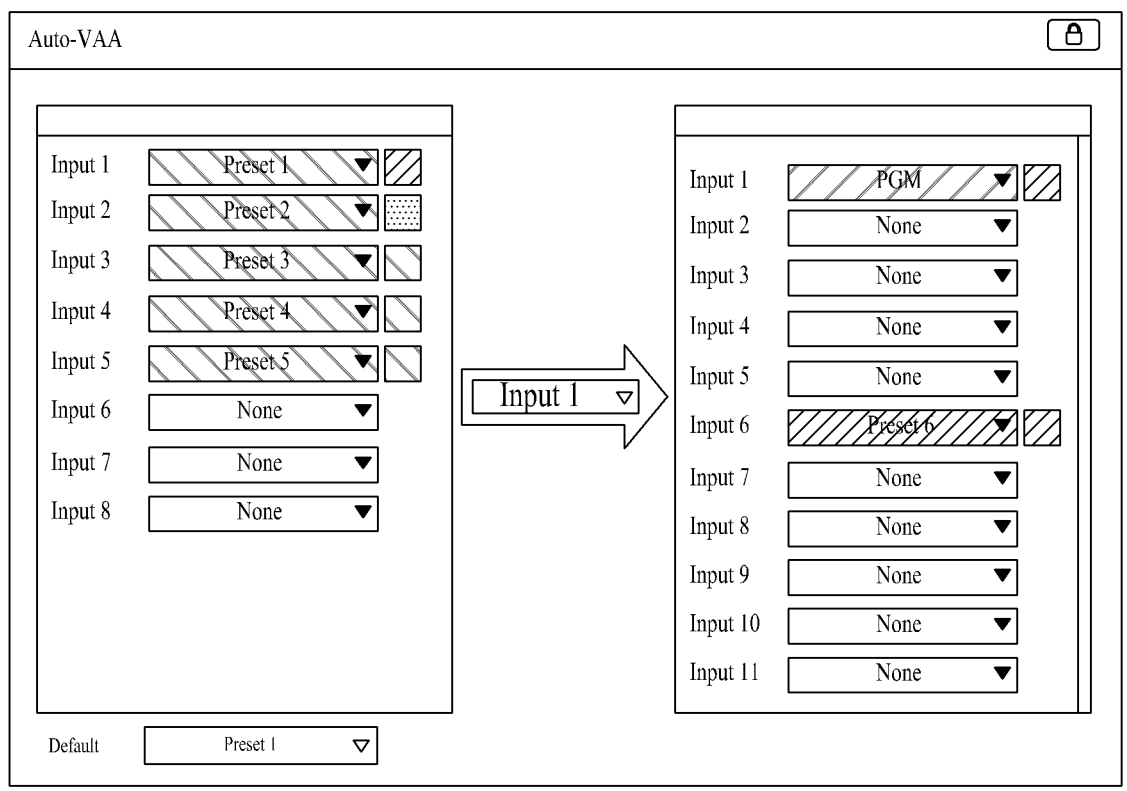

Here, referring to FIG. 9F, in response to a request from the creator through a connection area, the computer system 100 may set, for example, an output of the video studio 511 and a connection relationship of the video mixer 515. In FIG. 9F, an output of a event source shown on the left may be set to be connected to Input 1 of an event source shown on the right. Therefore, a preset to be selected according to an event being relayed may be determined based on a connectivity. For example, occurrence of Input 1 of the event source on the right may indicate that the output of the event source on the left is being transmitted and thus, Input 1 may be processed as audio rendering information corresponding to an event (Input 1) that occurs in the event source on the left. For example, when the video mixer 515 is connected to the video studio 511, the computer system 100 may automatically match the audio rendering information to the relay screen from the video studio 511 in response to the request from the creator through the connection area. Referring to FIG. 9G, when the corresponding audio rendering information, for example, preset is input to correspond to each of the events, the computer system 100 may match the input audio rendering information to each corresponding event. Through this, an audio list for the audio rendering information may be matched to the event list. Referring to FIG. 9G or 9H, the computer system 100 may represent an event being relayed in the event list based on the tally information and the layer information from the corresponding event source.

Figure 10:
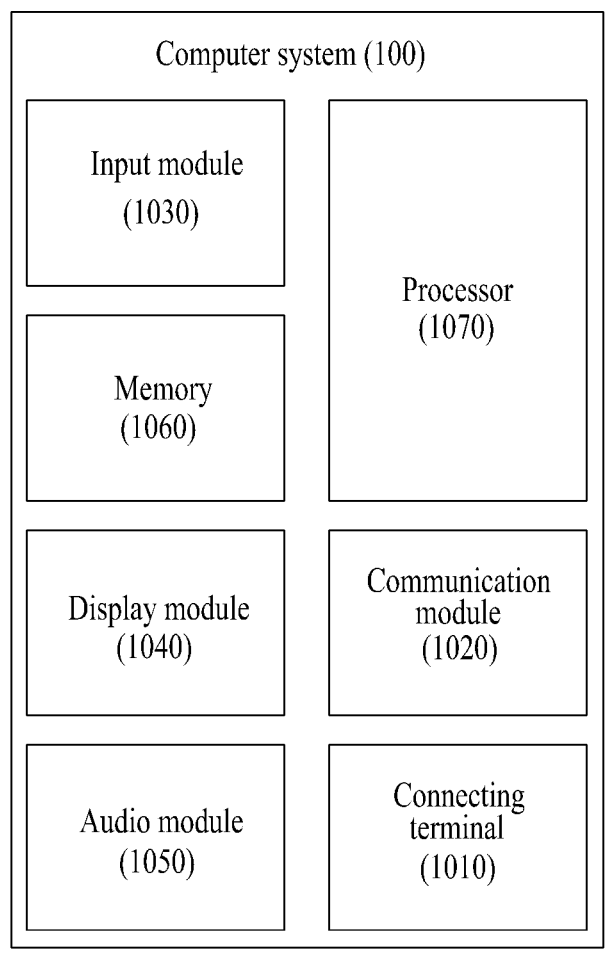
FIG. 10 is a diagram illustrating an example of an internal configuration of a computer system according to at least one example embodiment.

FIG. 10 is a diagram illustrating an example of the computer system 100 according to at least one example embodiment.

Referring to FIG. 10, the computer system 100 may include at least one of a connecting terminal 1010, a communication module 1020, an input module 1030, a display module 1040, an audio module 1050, a memory 1060, and a processor 1070. In some example embodiments, at least one of components of the computer system 100 may be omitted and at least one or more other components may be added. In some example embodiments, at least two components among components of the computer system 100 may be implemented as single integrated circuitry. In some example embodiments, components of the computer system 100 may be implemented as a single device or may be implemented in a plurality of devices in a distributed manner.

The connecting terminal 1010 may be physically connected to an external device in the computer system 100. To this end, the connecting terminal 1010 may include at least one connector. For example, the connector may include at least one of a high-definition multimedia interface (HDMI) connector, a universal serial bus (USB) connector, a secure digital (SD) card connector, and an audio connector.

The communication module 1020 may communicate with the external device in the computer system 100. The communication module 1020 may establish a communication channel between the computer system 100 and the external device and may communicate with the external device through the communication channel. For example, the external device may include at least one of an electronic device of the production environment 110 and the user 120. The communication module 1020 may include at least one of a wired communication module and a wireless communication module. The wired communication module may be connected to the external device in a wired manner through the connecting terminal 1010 and may communicate with the external device in the wired manner. The wireless communication module may include at least one of a near field communication module and a far field communication module. The near field communication module may communicate with the external device using a near field communication scheme. For example, the near field communication scheme may include at least one of Bluetooth, wireless fidelity (WiFi) direct, and infrared data association (IrDA). The far field communication module may communicate with the external device using a far field communication scheme. Here, the far field communication module may communicate with the external device over a network. For example, the network may include at least one of a cellular network, the Internet, and a computer network such as a local area network (LAN) and a wide area network (WAN).

The input module 1030 may input a signal to be used for at least one component of the computer system 100. The input module 1030 may include at least one of an input device configured for a creator to directly input a signal to the computer system 100, a sensor device configured to detect the ambient environment and to generate a signal, and a camera module configured to capture a video and to generate video data. For example, the input device may include at least one of a microphone, a mouse, and a keyboard. In some example embodiments, the sensor device may include at least one of touch circuitry configured to detect a touch and sensor circuitry configured to measure the amount of force occurring due to the touch.

The display module 1040 may visually display information. For example, the display module 1040 may include at least one of a display, a hologram device, and a projector. For example, the display module 1040 may be configured as a touchscreen through assembly to at least one of the sensor circuitry and the touch circuitry of the input module 1030.

The audio module 1050 may auditorily play back information. For example, the audio module 1050 may include at least one of a speaker, a receiver, an earphone or a headphone, an audio interface, and an IP-based audio network system.

The memory 1060 may store a variety of data used by at least one component of the computer system 100. For example, the memory 1060 may include at least one of a volatile memory and a non-volatile memory. Data may include at least one program and input data or output data related thereto. The program may be stored in the memory 1060 as software including at least one instruction. The memory 1060 may store a production tool for generating audio files and metadata related thereto.

The processor 1070 may control at least one component of the computer system 100 by executing the program of the memory 1060. Through this, the processor 1070 may perform data processing or operation. Here, the processor 1070 may execute the instruction stored in the memory 1060.

According to at least one example embodiment, the processor 1070 may receive an event list, an audio list, and event state information on a current event state. The event list may include a plurality of events related to a specific venue. Here, the events may represent different views of the same venue. That is, a plurality of events may be simultaneously generated for the same venue. Types of events may include at least one of, for example, a video scene, lighting, fireworks, fog, and a multiple view non-contact screen. The audio list may include audio rendering information that matches each of the events. The audio rendering information may represent a spatial audio attribute related to a corresponding event and may be configured in the form of a preset. In some example embodiments, each of the events may be set as an audio matching event for playing back audio content for a corresponding event or a non-audio matching event for not playing back the audio content for the corresponding event. The current event state may represent a state of an event currently being relayed. For example, the event state information may include at least one of tally information and layer information.

According to at least one example embodiment, the processor 1070 may output current audio content according to audio rendering information that matches one of the events based on the current event state. Here, the processor 1070 may receive the current audio content from the production environment 110 and may render the received current audio content. When the current event state is related to one of the events, the processor 1070 may output the current audio content according to the audio rendering information that matches the current event. When the current event is related to at least two of the events, the processor 1070 may output the current audio content according to the audio rendering information that matches one of the related events based on predetermined (or, alternatively, desired) priority. Here, the priority may be determined based on an audio matching status, a layer position, and an event source for each of the related events.

According to an example embodiment, the processor 1070 may determine audio rendering information based on the audio matching event from among the related events. According to another example embodiment, the processor 1070 may determine audio rendering information that matches an event of an upper layer among the related events, based on the layer information. According to still another example embodiment, when a plurality of event sources is connected to the computer system 100, the processor 1070 may determine one of the event sources based on a connection relationship between the event sources. Here, the processor 1070 may determine one of the event sources based on predetermined (or, alternatively, desired) priority or as a default. The processor 1070 may determine the audio rendering information that matches the event from the determined event source.

Figure 11:
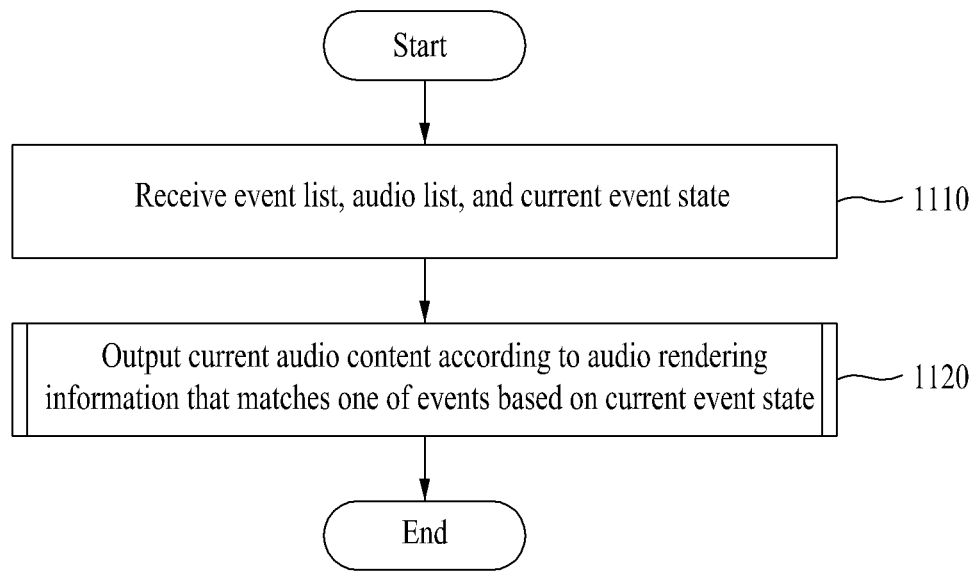
FIG. 11 is a flowchart illustrating an operation procedure of a computer system according to at least one example embodiment.

FIG. 11 is a flowchart illustrating an operation procedure of the computer system 100 according to at least one example embodiment.

Referring to FIG. 11, in operation 1110, the computer system 100 may receive an event list, an audio list, and event state information on a current event state. Here, the processor 1070 may receive the event list from at least one event source through the communication module 1020. The processor 1070 may receive in advance the audio list from the creator through the communication module 1020 or the input module 1030. Also, the processor 1070 may receive the current event state from the event source in real time through the communication module 1020.

The event list may include a plurality of events for a specific venue. Here, the events may represent different views for the same venue, respectively. That is, a plurality of events may be simultaneously generated for the same venue. Types of events may include at least one of, for example, a video scene, lighting, fireworks, fog, and a multiple view non-contact screen. The audio list may include audio rendering information that matches each of the events. The audio rendering information may represent a spatial audio attribute related to a corresponding event, and may be configured in the form of a preset. In some example embodiments, each of the events may be set as an audio matching event for playing back audio content for a corresponding event or a non-audio matching event for not playing back the audio content for the corresponding event. For example, referring to FIGS. 9A, 9B, 9C, 9D, 9E, 9F, 9G, and 9H, the processor 1070 may establish a connection with event sources through a user interface and may match audio rendering information to each of the events. The current event state may represent a state of an event currently being relayed. For example, the event state information may include at least one of tally information and layer information.

In operation 1120, the computer system 100 may output current audio content according to audio rendering information that matches one of the events based on the current event state. Here, the processor 1070 may receive the current audio content from the production environment 110 through the communication module 1020 and may render the current audio content. When the current event state is related to one of the events, the processor 1070 may output the current audio content according to the audio rendering information that matches the current event. When the current event is related to at least two of the events, the processor 1070 may output the current audio content according to the audio rendering information that matches one of the related events based on predetermined (or, alternatively, desired) priority. It will be further described with reference to FIG. 12.

Figure 12:
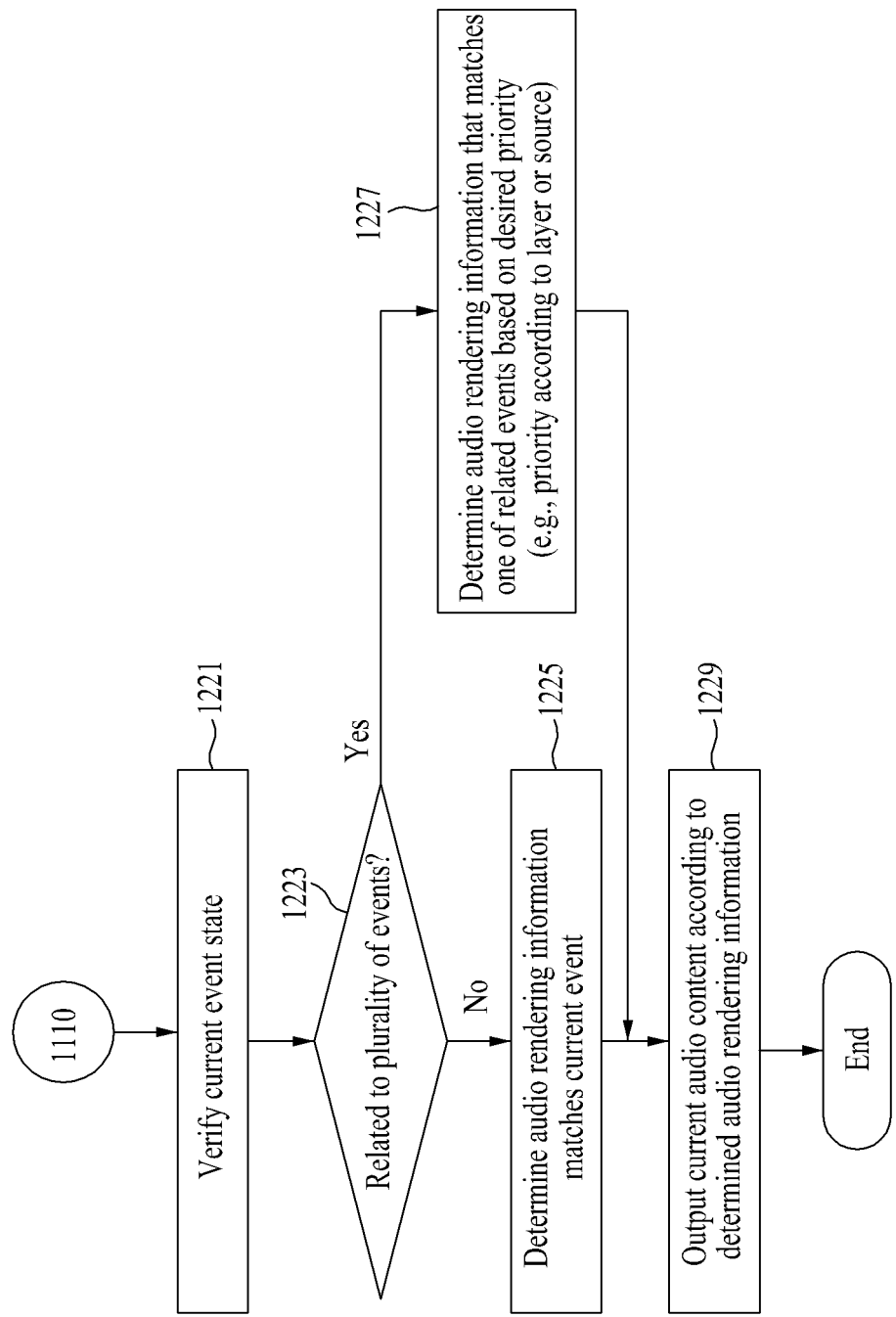
FIG. 12 is a flowchart illustrating a detailed procedure of outputting current audio content of FIG. 11.

FIG. 12 is a flowchart illustrating a detailed procedure of operation 1120 of outputting current audio content of FIG. 11.

Referring to FIG. 12, in operation 1221, the computer system 100 may verify the current event state. Here, the processor 1070 may analyze event state information received from at least one event source and may verify the current event state. Here, when a plurality of event sources is connected to the computer system 100, the processor 1070 may verify the current event state by analyzing event state information received from each of the event sources. Through this, in operation 1223, the computer system 100 may determine whether the current event state is related to the plurality of events.

Here, the processor 1070 may identify an event currently being relayed. For example, when the computer system 100 is connected to the video studio 511, the processor 1070 may identify the currently relayed event from among the events generated by the video studio 511. The processor 1070 may verify whether the currently relayed event is changed. For example, when the computer system 100 is connected to the video mixer 515, the processor 1070 may verify whether the currently relayed event is changed based on at least one of tally information and layer information from the video mixer 515. For example, the processor 1070 may determine whether not the currently relayed event but another event generated by the video mixer 515, for example, a split screen or an image, is inserted based on the tally information from the video mixer 515. As another example, the processor 1070 may verify whether another event generated by the video mixer 515, for example, a split screen or an image, is overlaid on the currently relayed event, based on the tally information and the layer information from the video mixer 515.

When it is determined that the current event state is related to a single event in operation 1223 (i.e., not related to a plurality of events), the computer system 100 may determine the audio rendering information that matches the current event in operation 1225. When the current event is the currently relayed event, the processor 1070 may determine audio rendering information that matches the relayed event. Alternatively, when the current event is the other event that is inserted instead of the currently relayed event, the processor 1070 may determine audio rendering information that matches the other event.

When it is determined that the current event state is related to the plurality of events in operation 1223, the computer system 100 may determine audio rendering information that matches one of the related events, based on predetermined (or, alternatively, desired) priority in operation 1227. According to an example embodiment, the processor 1070 may determine the audio rendering information based on the audio matching event among the related events. According to another example embodiment, the processor 1070 may determine audio rendering information that matches an event of an upper layer from among the related events based on the layer information. According to still another example embodiment, when a plurality of event sources is connected to the computer system 100, the processor 1070 may determine one of the event sources based on a connection relationship between the event sources. Here, the processor 1070 may determine one of the event sources based on predetermined (or, alternatively, desired) priority or as a default. Subsequently, the processor 1070 may determine audio rendering information that matches an event from the determined event source.

Through this, in operation 1229, the computer system 100 may output the current audio content according to the determined audio rendering information. That is, the processor 1070 may render the current audio content according to the determined audio rendering information and accordingly, may provide the rendered audio content to the user 120. According to an example embodiment, the events may be video scenes captured with different views in a broadcast program venue. For the full shot as shown in FIG. 3A, the processor 1070 may render audio content such that the user 120 may experience sound as if the user 120 is listening to the sound in one corner of the corresponding broadcast program venue. For the close-up shot of the specific person as shown in FIG. 3B or FIG. 3C, the user 120 may render the audio content such that the user 120 may experience sound as if the user 120 is listening to the sound in front of the corresponding person. Here, the computer system 100 may render the audio content such that a positional relationship between the corresponding person and a surrounding person may be expressed. For the spit screen that includes close-up shots of a plurality of persons as shown in FIG. 3D, the processor 1070 may render the audio content such that persons may be individually verified based on positions of the close-up shots on the split screen. According to other example embodiments, the events may be lighting or fireworks. In this case, the processor 1070 may render the current audio content according to audio rendering information that matches a color of the lighting or the fireworks.

According to at least one example embodiment, the computer system 100 may render event-customized audio content. To this end, different audio rendering information may be matched to different events of visual content. The computer system 100 may render the audio content according to audio rendering information that matches one of the events. Here, the computer system 100 may realize a sense of being-there for the user 120 by spatially processing the current audio content according to audio rendering information that matches an event currently being relayed. Therefore, by using the relayed event and the audio content rendered accordingly, the user 120 may perceive a sense of being-there as if the user 120 is present in the corresponding venue. That is, the computer system 100 may improve a sense of immersion of the user 120 in the visual content.

The method by the computer system 100 according to at least one example embodiment may include operation 1110 of receiving an event list of a plurality of events, an audio list for audio rendering information that matches each of the events, and event state information on a current event state, and operation 1120 of outputting current audio content according to audio rendering information that matches one of the events based on the current event state.

According to at least one example embodiment, operation 1120 of outputting the current audio content may include operation 1227 of when the current event state is related to at least two of the events in operation 1223, determining audio rendering information that matches one of the related events based on predetermined (or, alternatively, desired) priority, and operation 1229 of outputting the current audio content according to the determined audio rendering information.

According to at least one example embodiment, each of the events may be an audio matching event or a non-audio matching event.

According to at least one example embodiment, operation 1227 of determining audio rendering information that matches one of the related events may include determining the audio rendering information that matches one of the related events based on the audio matching event among the related events.

According to at least one example embodiment, the event state information may include layer information of the related events.

According to at least one example embodiment, operation 1227 of determining the audio rendering information that matches one of the related events may include determining audio rendering information that matches an event of an upper layer among the related events based on the layer information.

According to at least one example embodiment, the event state information may include tally information indicating at least one of the events.

According to at least one example embodiment, operation 1120 of outputting the current audio content may include, when a plurality of event sources are connected, determining one of the event sources based on a connection relationship between the event sources, and outputting the current audio content according to audio rendering information that matches an event from the determined event source.

According to at least one example embodiment, the determining of one of the event sources may include determining one of the event sources based on predetermined (or, alternatively, desired) priority, or determining one of the event sources as a default.

According to at least one example embodiment, the events may include at least one of a video scene, lighting, fireworks, fog, and a multiple view non-contact screen.

According to at least one example embodiment, the audio rendering information that matches each of the events may represent a spatial audio attribute used to spatially process audio content to be output in association with a corresponding event.

The computer system 100 according to at least one example embodiment may include the memory 1060, the communication module 1020, and the processor 1070 configured to connect to each of the memory 1060 and the communication module 1020, and to execute at least one instruction stored in the memory 1060.

According to at least one example embodiment, the processor 1070 may be configured to receive an event list of a plurality of events, an audio list for audio rendering information that matches each of the events, and event state information on a current event state, and to output current audio content according to audio rendering information that matches one of the events based on the current event state.

According to at least one example embodiment, the processor 1070 may be configured to, when the current event state is related to at least two of the events, determine audio rendering information that matches one of the related events based on predetermined (or, alternatively, desired) priority, and to output the current audio content according to the determined audio rendering information.

According to at least one example embodiment, each of the events may be an audio matching event or a non-audio matching event.

According to at least one example embodiment, the processor 1070 may be configured to determine the audio rendering information that matches one of the related events based on the audio matching event among the related events.

According to at least one example embodiment, the event state information may include layer information of the related events.

According to at least one example embodiment, the processor 1070 may be configured to determine audio rendering information that matches an event of an upper layer among the related events based on the layer information.

According to at least one example embodiment, the event state information may include tally information indicating at least one of the events.

According to at least one example embodiment, the processor 1070 may be configured to, when a plurality of event sources is connected, determine one of the event sources based on a connection relationship between the event sources, and to output the current audio content according to audio rendering information that matches an event from the determined event source.

According to at least one example embodiment, the processor 1070 may be configured to determine one of the event sources based on predetermined (or, alternatively, desired) priority, or determine one of the event sources as a default.

According to at least one example embodiment, the events may include at least one of a video scene, lighting, fireworks, fog, and a multiple view non-contact screen.

According to at least one example embodiment, the audio rendering information that matches each of the events may represent a spatial audio attribute used to spatially process audio content to be output in association with a corresponding event.

The apparatuses described herein may be implemented using hardware components, software components, and/or a combination of the hardware components and the software components. For example, a processing device and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, other processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical equipment, computer storage medium or device, to provide instructions or data to the processing device or be interpreted by the processing device. The software also may be distributed over network coupled computer systems so that the software is stored and executed in a distributed fashion. The software and data may be stored by one or more computer readable storage mediums.

The methods according to at least one example embodiment may be implemented in a form of a program instruction executable through various computer methods and recorded in computer-readable media. Here, the media may be to continuously store a computer-executable program or to temporarily store the same for execution or download. The media may be various types of record methods or storage methods in which single hardware or a plurality of hardware is combined and may be distributed over a network without being limited to a medium that is directly connected to a computer system. Examples of the media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software.

Various example embodiments and the terms used herein are not construed to limit description disclosed herein to a specific implementation and should be understood to include various modifications, equivalents, and/or substitutions of a corresponding example embodiment. In the drawings, like reference numerals refer to like components throughout the present specification. The singular forms "a," "an," and "the" are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe corresponding components regardless of order or importance and the terms are simply used to distinguish one component from another component. The components should not be limited by the terms. When a component (e.g., a first component) is described to be "(functionally or communicatively) connected to" or "accessed to" another component (e.g., a second component), the component may be directly connected to the other component or may be connected through still another component (e.g., a third component).

The term "module" used herein may include a unit configured as hardware, software, or firmware, and may be interchangeably used with the terms, for example, "logic," "logic block," "part," "circuit," etc. The module may be an integrally configured part, a minimum unit that performs at least one function, or a portion thereof. For example, the module may be configured as an application-specific integrated circuit (ASIC).

According to at least one example embodiment, each of the components (e.g., module or program) may include a singular object or a plurality of objects. According to at least one example embodiment, at least one of the components or operations may be omitted. Alternatively, at least one another component or operation may be added. Alternatively or additionally, a plurality of components (e.g., module or program) may be integrated into a single component. In this case, the integrated component may perform one or more functions of each of the components in the same or similar manner as it is performed by a corresponding component before integration. According to at least one example embodiment, operations performed by a module, a program, or another component may be performed in a sequential, parallel, iterative, or heuristic manner. Alternatively, at least one of the operations may be performed in different sequence or omitted. Alternatively, at least one another operation may be added.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method performed by a computer system, the method comprising:
    receiving an event list of a plurality of events, an audio list for audio rendering information that matches each of the events, and event state information on a current event state; and
    outputting current audio content according to audio rendering information that matches one of the events based on the current event state, and
    wherein the outputting of the current audio content comprises:
        when the current event state is related to at least two of the events, determining audio rendering information that matches one of the related events based on predetermined priority; and
        outputting, to an electronic device, the current audio content according to the determined audio rendering information along with visual content from the at least two of the events and displaying the visual content from the at least two events, wherein the audio content output provided with the displayed visual content only matches one of the related events based on the predetermined priority, and
    wherein the event state information includes layer information of the related events, and
    further wherein the processor is configured to determine audio rendering information that matches an event of an upper layer among the related events based on the layer information.

2. The method of claim 1, wherein each of the events is an audio matching event or a non-audio matching event, and
    wherein the determining of the audio rendering information that matches one of the related events comprises determining the audio rendering information that matches one of the related events based on the audio matching event among the related events.

3. A method performed by a computer system, the method comprising:
    receiving an event list of a plurality of events, an audio list for audio rendering information that matches each of the events, and event state information on a current event state; and
    outputting current audio content according to audio rendering information that matches one of the events based on the current event state,
    wherein the outputting of the current audio content comprises:
        when the current event state is related to at least two of the events, determining audio rendering information that matches one of the related events based on predetermined priority; and
        outputting the current audio content according to the determined audio rendering information; and
    wherein the event state information includes layer information of the related events, and
    wherein the determining of the audio rendering information that matches one of the related events comprises determining audio rendering information that matches an event of an upper layer among the related events based on the layer information.

4. The method of claim 1, wherein the event state information includes tally information indicating at least one of the events.

5. The method of claim 1, wherein the outputting of the current audio content comprises:
    when a plurality of event sources is connected, determining one of the event sources based on a connection relationship between the event sources; and
    outputting the current audio content according to audio rendering information that matches an event from the determined event source.

6. The method of claim 5, wherein the determining of one of the event sources comprises:
    determining one of the event sources based on predetermined priority; or
    determining one of the event sources as a default.

7. The method of claim 1, wherein the events include at least one of a video scene, lighting, firework, fog, and a multiple view non-contact screen.

8. The method of claim 1, wherein the audio rendering information that matches each of the events represents a spatial audio attribute used to spatially process audio content to be output in association with a corresponding event.

9. A non-transitory computer-readable recording medium storing instructions that, when executed by a processor, cause the processor to computer-implement the method of claim 1.

10. A computer system comprising:
    a memory;
    a communication module; and
    a processor configured to connect to each of the memory and the communication module, and to execute at least one instruction stored in the memory,
    wherein the processor is configured to:
    receive an event list of a plurality of events, an audio list for audio rendering information that matches each of the events, and event state information on a current event state, and
    output current audio content according to audio rendering information that matches one of the events based on the current event state, and wherein the processor is configured to:
> when the current event state is related to at least two of the events, determine audio rendering information that matches one of the related events based on desired priority, and
> output, to an electronic device, the current audio content according to the determined audio rendering information, and
> wherein the event state information includes layer information of the related events, and
> further wherein the processor is configured to determine audio rendering information that matches an event of an upper layer among the related events based on the layer information.

11. The computer system of claim 10, wherein each of the events is an audio matching event or a non-audio matching event, and
> wherein the processor is configured to determine the audio rendering information that matches one of the related events based on the audio matching event among the related events.

12. The computer system of claim 10, wherein the event state information includes tally information indicating at least one of the events.

13. The computer system of claim 10, wherein the processor is configured to,
> when a plurality of event sources is connected, determine one of the event sources based on a connection relationship between the event sources, and
> output the current audio content according to audio rendering information that matches an event from the determined event source.

14. The computer system of claim 13, wherein the processor is configured to,
> determine one of the event sources based on predetermined priority, or
> determine one of the event sources as a default.

15. The computer system of claim 10, wherein the events include at least one of a video scene, lighting, fireworks, fog, and a multiple view non-contact screen.

16. The computer system of claim 10, wherein the audio rendering information that matches each of the events represents a spatial audio attribute used to spatially process audio content to be output in association with a corresponding event.

17. The method of claim 1, wherein the visual content includes views from the at least two of the events.

18. The computer system of claim 10, wherein the output, to the electronic device, of current audio content according to the determined audio rendering information also includes an output, to the electronic device, of visual content from the at least two of the events and a display of the visual content from the at least two events, wherein the audio content output provided with the displayed visual content only matches one of the related events based on the desired priority.

* * * * *